United States Patent [19]

Potter et al.

[11] Patent Number: 5,132,129
[45] Date of Patent: Jul. 21, 1992

[54] PRODUCTION OF THIN WALLED HOLLOW POLYURETHANE ARTICLES AND POLYURETHANE COATINGS ON SUBSTRATES

[75] Inventors: William D. Potter, Hardwick; Nicholas D. White, Bishops Stortford, both of England

[73] Assignee: LRC Products Limited, London, England

[21] Appl. No.: 567,267

[22] Filed: Aug. 14, 1990

[30] Foreign Application Priority Data

Aug. 18, 1989 [GB] United Kingdom ............... 8918888

[51] Int. Cl.$^5$ .............................................. A61K 9/00
[52] U.S. Cl. ............................................ 427/2; 427/340; 427/341; 427/379; 427/388.2; 427/430.1
[58] Field of Search ................ 427/333, 341, 385.5, 427/430.1, 388.2, 2, 340, 379

[56] References Cited

U.S. PATENT DOCUMENTS

| | | | |
|---|---|---|---|
| 3,423,230 | 1/1969 | Georges | 427/333 |
| 3,802,912 | 4/1974 | Otocka | |
| 4,211,804 | 7/1980 | Brizzolara | 427/385.5 |
| 4,217,381 | 8/1980 | Asano | 427/341 |
| 4,259,183 | 3/1981 | Cadotte | 427/246 |
| 4,427,003 | 1/1984 | Fennimore et al. | 427/341 |
| 4,447,582 | 5/1984 | Gros | 525/279 |
| 4,557,976 | 12/1985 | Geist et al. | 427/388.2 |
| 4,568,612 | 2/1986 | Lehner et al. | 427/128 |
| 4,601,951 | 7/1986 | Fertell et al. | 427/341 |
| 4,631,206 | 12/1986 | Mabuchi et al. | 427/340 |
| 4,701,403 | 10/1987 | Miller | 427/340 |
| 4,833,014 | 5/1989 | Linder et al. | 427/333 |
| 4,857,363 | 8/1989 | Sasaki et al. | 427/340 |
| 4,891,248 | 1/1990 | Kraus | 427/340 |
| 4,933,213 | 6/1990 | Fourquier et al. | 427/340 |

FOREIGN PATENT DOCUMENTS

| | | |
|---|---|---|
| 0002196 | 6/1979 | European Pat. Off. |
| 1435748 | 5/1976 | United Kingdom |
| 2011913 | 7/1979 | United Kingdom |

*Primary Examiner*—Michael Lusignan
*Assistant Examiner*—Diana L. Dudash
*Attorney, Agent, or Firm*—Pearne, Gordon, McCoy & Granger

[57] ABSTRACT

A process for making thin walled hollow polymeric articles or for forming a polymeric coating on a substrate, comprises contacting a suitably shaped former on a substrate to be coated with a solution of an amine-terminated prepolymer having a functionality of at least 2 in an organic solvent to form a coating on the former or substrate, drying the coating on the former or substrate, then contacting the coating on the former or substrate with a solution of a polyfunctional curing agent which is capable of reacting with the amino end groups of the prepolymer to cause chain extension and/or cross-linking of the latter.

12 Claims, No Drawings

PRODUCTION OF THIN WALLED HOLLOW POLYURETHANE ARTICLES AND POLYURETHANE COATINGS ON SUBSTRATES

This invention is concerned with the production of thin walled hollow polymeric articles on suitably shaped formers by dipping and other procedures and also with the formation of polymeric coatings on substrates.

The production of condoms and gloves by the dipping of suitably shaped formers in rubber latex is a well established manufacturing process. While vulcanized natural rubber has a number of properties which make it the material of choice for such articles, for example its elasticity and strength, it is increasingly considered to be deficient as to other properties, such as puncture and tear resistance and resistance to organic solvents and oils.

It has been proposed to make thin walled hollow polymeric articles, such as gloves and condoms, from high molecular weight polyurethanes by dipping a former into a solution of the polymer. Polyurethanes have been proposed for this purpose which have a desirable combination of properties including, in particular better puncture and tear resistance than vulcanized natural rubber. Solutions of such polyurethanes are too viscous for dipping unless the polymer content of the solution is kept low and this, in turn, requires that multiple dipping operations are carried out in order to form films of adequate thickness and mechanical properties; this increases the cost and complexity of the process.

We have now developed a process for making thin walled hollow polymeric articles by dipping and other methods, which enables low molecular weight prepolymers to be used and, consequently, coating solutions having a higher solids content so that coatings of an acceptable, and commercial, thickness can be obtained quickly and simply. By appropriate choice of the prepolymer and other process variables, the mechanical properties of the articles obtained can, within limits, be varied to meet specific performance requirements; such properties will, in general terms, be similar or superior to those of vulcanized natural rubber.

While the present invention is primarily concerned with the making of thin walled hollow polymeric articles, the process can equally be used to form coatings on substrates, the substrate taking the place of the former referred to above and the coating not being stripped from the substrate as is, of course, done in making thin walled hollow articles. The substrate may, for example, be a pre-formed hollow polymeric article, such as a pre-formed rubber glove, and the process then provides a method of forming a polymeric coating on the glove, which coating has different properties from the rubber of the glove.

According to the present invention, there is provided a process for making thin walled hollow polymeric articles or for forming a polymeric coating on a substrate, which comprises contacting a suitably shaped former or a substrate to be coated with a solution of an amine-terminated prepolymer having a functionality of at least 2 in an organic solvent to form a coating on the former or substrate, drying the coating on the former or substrate, then contacting the coating on the former or substrate with a solution of a polyfunctional curing agent which is capable of reacting with the amino end groups of the prepolymer to cause chain extension and/or cross-linking of the latter.

For convenience, the following description will refer to the production of thin walled hollow articles, but the procedure and materials described are, of course, equally applicable to the formation of polymeric coatings on substrates.

The first coating stage of the process, that is the coating of the former with the prepolymer solution may be effected by dipping, slush molding or spraying (that is spraying the former with the prepolymer solution). The first procedure mentioned, dipping, is generally preferred.

The contacting of the prepolymer coating on the former with the polyfunctional curing agent may be effected by dipping the former in a solution of the curing agent or by spraying the coating on the former with such a solution.

The molecular weight of the amine-terminated prepolymer should be relatively low so that its solutions have a relatively low viscosity, thus enabling solutions having a relatively high solids content to be used. It is generally preferred that the prepolymer should have a number average molecular weight ($M_n$) of from 8000 to 60,000.

The amine-terminated prepolymer must have a functionality of at least 2. These prepolymers may be prepared by reacting an isocyanate-terminated polymeric precursor with a di-, tri- or poly-amine. The backbone chains of such precursors may, for example, be a polyether, a polyester or a polybutadiene, of which polyether backbones are the most preferred. The backbone of the isocyanate-terminated polymeric precursor may be branched as well as linear and may contain repeating units of more than one type.

Suitable isocyanate-terminated polymeric precursors may be readily prepared from starting materials which are conventionally used in the production of polyurethanes by procedures and under reaction conditions which are well known to those skilled in the art.

Particularly preferred isocyanate-terminated polymeric precursors are those obtained by reacting suitable proportions of (i) a polymeric diol, (ii) a triol, and (iii) a diisocyanate so as to obtain a precursor having a $M_n$ within the range specified above and, more preferably, of 10,000 to 25,000 and a terminal isocyanate group functionality of about 2.1. The reaction is preferably carried out in the presence of a catalyst, such as dibutyl tin dilaurate, and an organic solvent, such as dichloromethane (methylene chloride), chloroform, carbon tetrachloride, tetrachloroethylene, 2-chloropropane, trichloroethylene, chlorobenzene, toluene, ethyl acetate or tetrahydrofuran, and mixtures of two or more thereof.

Suitable polymeric diols include, for example, poly(tetramethylene ether) glycol having a molecular weight of about 2900 (this material is commercially available as "Terathane" 2900), polypropylene glycol having a molecular weight of about 2025, and poly (ethylene butylene adipate) having a molecular weight of about 2000. A suitable triol is, for example, trimethylol propane. A preferred diisocyanate is 4,4'-dicyclohexylmethane diisocyanate (HMDI).

The reaction mixture, that is the solution of the product polymeric precursor in the reaction solvent, is preferably used directly in the next stage of the process, that is the precursor is not isolated.

The isocyanate-terminated polymeric precursor is then reacted with a di-, tri- or poly-amine to produce an amine-terminated prepolymer. This reaction should be carried out so as to minimize chain extension and cross-linking of the precursor. To this end it is preferred to add a solution of the isocyanate-terminated polymeric precursor (preferably the reaction mixture mentioned above) to a stoichiometric excess of the di-, tri- or poly-amine; when a diamine is used a suitable ratio of amine groups to isocyanate groups is 2.05 to 1. The addition of the precursor solution should be effected with vigorous agitation.

Suitable diamines are, for example, ethylene diamine, 1,2-diaminopropane, 1,3-diaminopropane, 1,6-diaminohexane, N-methylethylenediamine, N,N'-dimethylethylenediamine, and piperazine.

It is not necessary to separate the amine-terminated prepolymer obtained from the reaction mixture, though this may be done if desired.

It is usually preferred for reasons of solvent economy to carry out the two chemical synthesis steps so far described, that is the preparation of isocyanate-terminated polymeric precursor and the reaction of the latter with the amine, with relatively concentrated solutions, for example with solutions containing 35% by weight solids. Such concentrations may be too high for dipping or spraying and if the solution of the amine-terminated prepolymer is a reaction mixture as described above, it can be diluted with the same or a different solvent, such as any of those mentioned above.

If the amine-terminated prepolymer has been separated, for the purpose of the process of the invention it is dissolved in a suitable solvent, such as any of those mentioned above, to form the solution used for dipping, spraying or slush moulding. This solution preferably has a solids content of 10 to 30%, more preferably 15 to 30%, by weight.

Dipping is carried out in the conventional way with suitably shaped formers. Withdrawal of the former from the dipping solution should be effected slowly.

The initial coating is then dried on the former. The drying conditions used will depend on the nature of the solvent present in the coating solution. For dichloromethane and a number of other solvents, drying at a temperature of from 40° to 80° C. for up to 15 minutes is, for example, suitable. The former should then be allowed to cool or be forcibly cooled to room temperature.

In the next stage the coated former is dipped in or sprayed with an organic solvent solution of a polyfunctional curing agent capable of reacting with the amino end groups. A relatively dilute solution, for example, a solution containing 0.5 to 10%, more preferably about 1%, by weight of the curing agent, in dichloromethane or one of the other solvents specified above is preferred.

The functionality of the curing agent should be at least two and can usefully be three or more. Suitable curing agents include, for example, polyfunctional carboxylic acid chlorides (derived from aliphatic, aromatic, alicyclic or heterocyclic acids), sulphur oxychlorides, phosphorus oxychlorides, and cyanuric chloride. Preferred curing agents include, for example, terephthaloyl chloride, adipoyl chloride, benzene-1,3-disulphonyl chloride, and benzene-1,3,5-tricarboxylic acid chloride.

The reaction between the amino end groups and the curing agent is rapid and, surprisingly, gives rise to a useful product. Whilst not wishing to be bound by theory, it is considered that the reaction is a self-controlling stoichiometric reaction. Thus, where a diacid chloride is used as the curing agent, one diacid chloride reacts with two amino groups, not one amino group as would be expected in a situation where the curing agent is present in stoichiometric excess. The reaction is tolerant of a wide range of reaction conditions and the presence of impurities, particularly water, in the reaction mixture.

Under the conditions likely to be found in practice, dipping of the coated former into the curing agent solution, or spraying the former with the solution, for five seconds is normally sufficient for the cross-linking chain/extension reaction to be initiated.

The coating on the former is then preferably heated to effect further curing of the polymer. This heating stage is preferably effected at 80° to 110° c. for up to 30 minutes, more preferably at about 100° C. for 10 minutes.

In order that the invention may be more fully understood, the following examples are given by way of illustration only. The properties of the films obtained are set out in Table 1 below, together with the properties of a typical prepolymer film and typical properties for vulcanised natural rubber, the latter two being given for the purpose of comparison.

EXAMPLE 1

Prepolymer 1

To a stirred, refluxing solution of 4,4'-dicyclohexylmethane diisocyanate (available commercially as Desmodur W from Bayer, 357.4 g) in dichloromethane (1000 ml) there was added over a period of 15 minutes, a solution of poly(tetramethylene ether) glycol of mol. wt 2000 (available commercially as Terathane 2000 from Du Pont, 2030 g), 1,1,1-trimethylolpropane (9.8 g) and dibutyl tin dilaurate (4.2 g) in dichloromethane (2000 ml). The mixture was refluxed for a further two hours and then allowed to cool to room temperature. The isocyanate-terminated polymeric precursor thus obtained was then added slowly, with stirring, to a solution of ethylene diamine (21.3 g) in dichloromethane (500 ml) to produce an amine-terminated prepolymer, $M_n = 15,000$.

Polymer 1

A film of the amine-terminated prepolymer was obtained by dipping a suitably shaped former (made, for example, of glass, glazed ceramic or polypropylene) into the prepolymer solution (solids = 15-20% by eight, entry speed = 22 mm/sec) and removing the former immediately (exit speed = 3.8 mm/sec).

The solvent was removed by evaporation at room temperature followed by heating to 70° C. for 10 minutes. The former was allowed to cool to room temperature and then dipped into a 1% w/v solution of terephthaloyl chloride in dichloromethane (dwell time = 10 seconds) to cure the film. The solvent was removed by evaporation at room temperature followed by heating to 100° C. for 10 minutes, leaving a film which, after cooling the former to room temperature, was easily removed.

The properties of this film are shown in Table 1.

EXAMPLE 2

Polymer 2

The procedure of Example 1 was repeated, except that the prepolymer film was cured using a 1% w/v solution of benzene-1,3-disulphonyl chloride in dichloromethane. The properties of the film obtained are shown in Table 1.

EXAMPLE 3

Polymer 3

The procedure of Example 1 was repeated, except that the prepolymer film was cured using a 1% w/v solution of benzene-1,3,5-tricarboxylic acid chloride in dichloromethane. The properties of the film are shown in Table 1.

EXAMPLE 4

Prepolymer 2

An isocyanate-terminated polymeric precursor was prepared by reacting poly(tetramethylene ether) glycol of mol. wt 2000 (500 g), 1,2,6-trihydroxy-hexane (2.24 g), isophorone diisocyanate (from Huls, 83.6 g) and dibutyl tin dilaurate (b 2.5 g) in refluxing dichloromethane (1500 ml) using the procedure described in Example 1. This polymeric precursor was then added slowly, with stirring, to a solution of ethylene diamine (9.9 g) in dichloromethane to produce an amine-terminated prepolymer, $M_n = 11,000$.

Polymer 4

The rest of the procedure of Example 1 was repeated. The properties of the film obtained are shown in Table 1.

EXAMPLE 5

Prepolymer 3

An isocyanate-terminated polymeric precursor was prepared by reacting poly(tetramethylene ether) glycol of mol. wt. 2900 (available commercially as Terathane 2900 from Du Pont, 480 g), 1,1,1-trimethylolpropane (1.5 g), dibutyl tin dilaurate (3 g) and methylene di(cyclohexylisocyanate) (80 g) in refluxing ethyl acetate (1500 ml) using the procedure described in Example 1. This polymeric precursor was then added slowly, with stirring, to a solution of ethylene diamine (12.5 g ) in ethyl acetate to produce an amine-terminated prepolymer, $M_n = 23,000$.

Film of Prepolymer 3

A film of the amine-terminated prepolymer was obtained by dipping a flat polypropylene plate into the prepolymer solution and removing the plate immediately (exit speed=3.8 mm/sec). The solvent was removed by evaporation at room temperature followed by heating to 70° C. for 10 minutes. After cooling to room temperature the film was dusted with talcum powder to hinder self-adhesion of the film and the film was removed from the plate. The properties of this film are shown in Table 1.

Polymer 5

The prepolymer film as just described was cured by reaction with terephthaloyl chloride following the procedure of Example 1. The properties of the film are shown in Table 1.

EXAMPLE 6

Prepolymer 4

An isocyanate-terminated polymeric precursor was prepared by reacting poly(tetramethylene ether) glycol of mol.wt 2900 (500 g), 1,1,1-trimethylol propane (1.5 g), dibutyl tin dilaurate (0.4 g), distilled water (1.0 g) and methylene di(cyclohexyl isocyanate) (102.5 g) in refluxing tetrahydrofuran (1000 ml) using the procedure described in Example 1. This polymeric precursor was then added slowly, with stirring, to a solution of ethylenediamine (10.8 g) in tetrahydrofuran to produce an amine-terminated prepolymer, Mn=25,620.

Polymer 6

The rest of the procedure of Example 1 was repeated. The properties of the film obtained are shown in Table 1.

EXAMPLE 7

Prepolymer 5

An isocyanate-terminated polymeric precursor was prepared by reacting poly(tetramethylene ether) glycol of mol. wt 2900 (1200 g), 1,1,1-trimethylol propane (3.6 g), dibutyl tin dilaurate (7.5 g) and methylene di(cyclohexyl isocyanate) (199.2 g) in refluxing tetrahydrofuran (3000 ml ) using the procedure described in Example 1. This polymeric precursor was then added slowly, with stirring, to a solution of N,N'-dimethylethylenediamine (28 g) in tetrahydrofuran to produce an amine-terminated prepolymer, Mn=21,500.

Polymer 7

The rest of the procedure of Example 1 was repeated, except that tetrahydrofuran was used as a solvent for the acid chloride. The properties of the film obtained are shown in Table 1.

TABLE 1

| | FILM PROPERTIES | | | | |
| --- | --- | --- | --- | --- | --- |
| | Thickness (mm) | Tensile Strength (MPa) | Elongation at Break (%) | Stress at 100% Strain (MPa) | Tear Resistance (N · mm$^{-1}$) |
| Polymer | | | | | |
| 1 | 0.057 ± 0.007 | 29.4 ± 5.6 | 540 ± 54 | 2.56 ± 0.17 | 37.5 ± 2.0 |
| 2 | 0.088 ± 0.001 | 21.2 ± 1.1 | 1060 ± 29 | 1.12 ± 0.5 | 19.9 ± 1.6 |
| 3 | 0.090 ± 0.003 | 22.9 ± 1.3 | 655 ± 10 | 1.57 ± 0.07 | 24.4 ± 0.9 |
| 4 | 0.038 ± 0.004 | 19.4 ± 3.7 | 648 ± 84 | 1.65 ± 0.14 | 15.6 ± 1.1 |
| 5 | 0.070 ± 0.008 | 43.8 ± 5.2 | 679 ± 36 | 2.5 ± 0.1 | 43.5 ± 3.7 |
| 6 | 0.090 ± 0.012 | 64.9 ± 4.8 | 658 ± 46 | 2.9 ± 0.3 | 58.1 ± 6.9 |
| 7 | 0.093 ± 0.017 | 30.7 ± 5.1 | 812 ± 76 | 1.9 ± 0.1 | 54.2 ± 4.7 |
| Pre-Polymer | | | | | |
| 3 | 0.074 ± 0.012 | 6.1 ± 2.0 | 802 ± 105 | 1.1 | 11.8 ± 0.5 |
| Vulc. natural | 0.06 | 27 | 874 | 0.6 | 41.6 |

TABLE 1-continued

| | FILM PROPERTIES | | | | |
|---|---|---|---|---|---|
| | Thickness (mm) | Tensile Strength (MPa) | Elongation at Break (%) | Stress at 100% Strain (MPa) | Tear Resistance (N · mm$^{-1}$) |
| rubber | | | | | |

Sample size = 5
Tensile properties measured according to British Standard BS903 Part A2
Tear properties measured according to British Standard BS903 Part A3 using angle tear test pieces.

By way of comment on the film properties summarised in Table 1, it will be seen that the strength and tear resistance properties of Polymer 1 are similar to those of vulcanized natural rubber. Polymer 5 has a substantially higher strength than vulcanised natural rubber, but a similar tear resistance, while the converse, i.e. similar strength, but higher tear resistance, is true for Polymer 7. Polymer 6 has substantially higher strength and tear resistance properties. Polymers 6 and 7 represent the currently preferred embodiments of the invention.

The properties of Polymers 2, 3 and 4 are generally worse than those of vulcanised natural rubber; these polymers were made at an early stage in the development of the present invention and are not currently preferred embodiments.

We claim:

1. A process for making thin walled hollow polymeric articles or for forming a polymeric coating on a substrate, which comprises contacting a suitably shaped former or a substrate to be coated with a solution of an amine-terminated prepolymer having a functionality of at least 2 in an organic solvent to form a coating on the former or substrate, drying the coating on the former or substrate, then contacting the coating on the former or substrate with a solution of a polyfunctional curing agent which reacts with the amino end groups of the prepolymer to cause chain extension and/or cross-linking of the latter.

2. A process according to claim 1, in which the coating of the former or substrate with the prepolymer solution is effected by dipping and the contacting of the prepolymer coating on the former or substrate with the polyfunctional curing agent is effected by dipping the former or substrate in the solution of the curing agent.

3. A process according to claim 1, in which the prepolymer has a number average molecular weight of from 8000 to 60,000.

4. A process according to claim 1, in which the prepolymer is the reaction product of an isocyanate-terminated polymeric precursor with an amine selected from the group consisting of di-, tri- and polyamines.

5. A process according to claim 4, in which a diamine is sued, said diamine being selected from the group consisting of ethylene diamine, 1,2-diaminopropane and piperazine.

6. A process according to claim 4, in which the prepolymer is formed by adding a solution of the isocyanate-terminated polymeric precursor to a stoichiometric excess of the amine, the addition being effected with vigorous agitation.

7. A process according to claim 4, in which the isocyanate-terminated polymeric precursor is the reaction product of (i) a polymeric diol, (ii) a triol, and (iii) a diisocyanate, said reactants and their respective proportions being such that the polymeric precursor has a number average molecular weight of from 10,000 to 25,000 and a terminal isocyanate group functionality of about 2.1.

8. A process according to claim 7, in which the polymeric diol is selected from the group consisting of poly(tetramethylene ether) glycol having a molecular weight of about 2900, polypropylene glycol having a molecular weight of about 2025, and poly(ethylene butylene adipate) having a molecular weight of about 2000; the triol is trimethylol propane; and the diisocyanate is 4,4'-dicyclohexylmethane diisocyanate.

9. A process according to claim 1, in which the solution of the amine-terminated prepolymer with which the former or substrate is contacted has a solids content of 15 to 30% by weight.

10. A process according to claim 1, in which the polyfunctional curing agent is selected from the group consisting of polyfunctional carboxylic acid chlorides, sulphur oxychloride, phosphorus oxychloride, and cyanuric chloride.

11. A process according to claim 1, in which the solution of the polyfunctional curing agent contains about 1% by weight of said curing agent.

12. A process according to claim 1, in which following the reaction of the prepolymer with the polyfunctional curing agent, the coating on the former or substrate is heated to effect further curing of the polymer.

* * * * *